United States Patent
Obot et al.

(10) Patent No.: US 10,844,282 B2
(45) Date of Patent: Nov. 24, 2020

(54) CORROSION INHIBITING FORMULATIONS AND USES THEREOF

(71) Applicant: King Fahd University of Petroleum and Minerals, Dhahran (SA)

(72) Inventors: Ime Bassey Obot, Dhahran (SA); Ikenna Benedict Onyeachu, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 120 days.

(21) Appl. No.: 16/298,494

(22) Filed: Mar. 11, 2019

(65) Prior Publication Data
US 2020/0291297 A1 Sep. 17, 2020

(51) Int. Cl.
*C09K 15/30* (2006.01)
*C23F 11/14* (2006.01)

(52) U.S. Cl.
CPC ............ *C09K 15/30* (2013.01); *C23F 11/149* (2013.01)

(58) Field of Classification Search
CPC .................................. C09K 15/30; C23F 11/149
See application file for complete search history.

(56) References Cited

U.S. PATENT DOCUMENTS

| | | | |
|---|---|---|---|
| 5,779,938 A * | 7/1998 | Naraghi | C23F 11/149 252/391 |
| 6,235,093 B1 * | 5/2001 | Okuhama | C23C 18/44 106/1.18 |
| 6,585,933 B1 * | 7/2003 | Ehrhardt | C23F 11/08 252/180 |
| 6,743,303 B2 | 6/2004 | Montano et al. | |
| 10,323,327 B2 * | 6/2019 | Obot | C04B 41/88 |
| 2003/0230363 A1 * | 12/2003 | Sturgill | C23C 22/83 148/243 |
| 2004/0104377 A1 * | 6/2004 | Phelps | C09D 5/082 252/387 |
| 2012/0138868 A1 * | 6/2012 | Arifuku | B82Y 10/00 252/510 |
| 2016/0348252 A1 * | 12/2016 | Rane | C07D 235/12 |
| 2017/0183783 A1 * | 6/2017 | Tang | C23F 11/149 |

FOREIGN PATENT DOCUMENTS

CN 101838811 B 10/2012
EP 0 161 222 A2 5/1985

OTHER PUBLICATIONS

EIC Search Aug. 27, 2010 (Year: 2020).*
Aljourani, et al. ; Benzimidazole and its derivatives as corrosion inhibitors for mild steel in 1M HCl solution ; Corrosion Science, vol. 51, Issue 8 ; pp. 1836-1843 ; Aug. 2009 ; Abstract Only ; 1 Page.

* cited by examiner

Primary Examiner — Pamela H Weiss
(74) Attorney, Agent, or Firm — Oblon, McClelland, Maier & Neustadt, L.L.P.

(57) ABSTRACT

Corrosion inhibiting formulations including a substituted benzimidazole, a mercaptocarboxylic acid, a 2-thioxodihydropyrimidine-dione, a sulfhydryl alcohol, a surfactant, and a solvent. Methods for preventing, inhibiting, or reducing metal (e.g. carbon steel) corrosion utilizing these formulations are described. The formulations are effective against corrosion of metallic substrates in sweet (i.e. $CO_2$), sour (i.e. $H_2S$), and/or high salinity environments commonly found in petroleum industry.

20 Claims, 8 Drawing Sheets

CORROSION INHIBITING FORMULATIONS AND USES THEREOF

BACKGROUND OF THE INVENTION

Technical Field

The present disclosure relates to formulations that inhibit corrosion of metallic substrates and methods thereof. More specifically, the present disclosure relates to anti-corrosion formulations containing a substituted benzimidazole, a mercaptocarboxylic acid, a 2-thioxodihydropyrimidine-dione, a sulfhydryl alcohol, a surfactant, and a solvent, and methods for preventing or reducing metal corrosion using the formulations.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The presence of $H_2S$, $CO_2$, organic acids and brine solution in crude oil products creates a highly corrosive environment within the deep wells and oil pipeline infrastructure of the gas and oil industry. Two of the most significant types of corrosion are sweet ($CO_2$-induced) corrosion and sour ($H_2S$-induced) corrosion. Once dissolved in water, both $CO_2$ and $H_2S$ behave like weak acids and are able to oxidize steel. This is a well-known challenge in the oil and gas industry because it inflicts severe damage on the internal walls of the drilling and transportation pipelines, which are mostly steel-based materials. Although a protective layer of corrosion product may form on steel surfaces at certain pH conditions [S. Nesic, K. J. Lee, The mechanistic model of iron carbonate film growth and the effect on $CO_2$ corrosion of mild steel, NACE International, USA, 2002; and S. Nesic, J. Postlethwaite, S. Olsen, An electrochemical model for prediction of corrosion of mild steel in aqueous carbon dioxide solutions, Corrosion 52 (1996) 280-294], turbulent fluid flow increases wall shear stress under high pressure within the pipelines and prevents stable adhesion of the protective layers to the steel surface [M. V. Azghandi, A. Davoodi, G. A. Farzi, A. Kosari, Water-base acrylic terpolymer as a corrosion inhibitor for SAE1018 in simulated sour petroleum solution in stagnant and hydrodynamic conditions, Corrosion Science 64 (2012) 44-54]. The more dominant of either sweet or sour corrosion in oilfield pipelines depends on the relative abundance of each gas present [E. C. Greco, W. B. Wright, Corrosion of Iron in an $H_2S$—$CO_2$—$H_2O$ System, Corrosion 18(3) (1962) 119t; and D. Petelot, M. F. Galis, A. Sulmont, "Corrosive $H_2S$ Environments Study by Hydrogen Permeation Measurements—Correlation with HIC and SSC Test Results, NACE International, 1986]. Such corrosion may lead to sudden pipeline leakages/bursting, resulting in costly maintenance and delays in product delivery.

During sweet corrosion, $CO_2$ gas dissolves in water and the aqueous phase of drilling brine solutions to form a weak carbonic acid ($H_2CO_3$). The electrochemical corrosion process involves pH-dependent cathodic half-reactions that produce hydrogen gas and carbonate (or bicarbonate) ions. The oxidation of Fe (in steel) is the dominant anodic half-reaction. Although the electrochemical reaction leads to precipitation of an $FeCO_3$ layer on the steel surface, this protective layer is greatly destabilized by dissolution and hydromechanical rupture due, respectively, to extreme pH and fluid turbulence within the oilfield environment. The chemistry of sweet corrosion is given in Eq (1)-(6) below, while the schematic illustrating sweet corrosion process is shown in FIG. 3.

Aqueous dissolution: $CO_{2(g)} + H_2O_{(l)} \leftrightarrow H_2CO_{3(aq)}$ (1)

Cathodic reactions: $2H_2CO_{3(aq)} + 2e^- \rightarrow H_{2(g)} + 2HCO_{3(aq)}^-$; (pH 4-6) (2)

$2HCO_{3(aq)}^- + 2e^- \rightarrow H_{2(g)} + 2CO_{3(aq)}^{2-}$; (pH≥6) (3)

$2H^+_{(aq)} + 2e^- \rightarrow H_{2(g)}$; (pH<4) (4)

Anodic reaction: $Fe_{(s)} \rightarrow Fe^{2+}_{(aq)} + 2e^-$ (5)

Corrosion product: $Fe^{2+}_{(aq)} + CO_{3(aq)}^{2-} \rightarrow FeCO_{3(s)}$ (6)

Sour environments provide more aggressive corrosion conditions for steel and predominantly occur under conditions with a large $H_2S:CO_2$ ratio. The conditions for sour corrosion may result from naturally occurring $H_2S$ in the producing formation or from surface contamination such as injection water. The chemistry for the cathodic reduction of $H_2S$ during sour corrosion is not definitively known. The Fe oxidation to $Fe^{2+}$ remains the anodic reaction. Bolmer [P. W. Bolmer, Polarization of iron in $H_2S$—NaHS buffers, Corrosion 21 (1965) 69-75, incorporated herein by reference in its entirety] proposed the direct reduction reaction during which $H_2S$ gains an electron to yield a hydrogen atom and hydrogen sulfide ion.

$H_2S + e^- \leftrightarrow \frac{1}{2}H_2 + HS^-$ (7)

Martinez et al. [R. Galvan-Martinez, J. Mendoza-Flores, R. Duran-Romero, J. Genesca, Effect of turbulent flow on the anodic and cathodic kinetics of API X52 steel corrosion in $H_2S$ containing solutions. A rotating cylinder electrode study, Materials and Corrosion 58 (2007) 514-521, incorporated herein by reference in its entirety] tested the Bolmer [P. W. Bolmer, Polarization of iron in $H_2S$—NaHS buffers, Corrosion 21 (1965) 69-75, incorporated herein by reference in its entirety] mechanism using a rotating cylinder electrode, but noticed that corrosion potential was greatest for a region where the cathodic current was under $H^+$ mass transfer limitation. Nevertheless, the mechanism proposed by Shoesmith et al. [D. W. Shoesmith, P. Taylor, M. G. Bailey, D. G. Owen, The formation of ferrous monosulfide polymorphs during the corrosion of iron by aqueous hydrogen-sulfide at 21° C., Journal of the Electrochemical Society 127 (1980) 1007-1015, incorporated herein by reference in its entirety] appears to be the most widely adopted. It is mainly a solid state reaction between Fe and $H_2S$ to yield FeS and hydrogen gas. The reaction is initiated by a two-step partial dissociation of $H_2S$ once it has been dissolved in water.

$H_2S \leftrightarrow H^+ + HS^-$ (8)

$HS^- \leftrightarrow H^+ + S^{2-}$ (9)

$H_2S + 2e^- \leftrightarrow H_{2(g)} + S^{2-}$ (10)

$Fe^{2+} + S^{2-} \leftrightarrow FeS$ (11)

Occlusion of hydrogen and sulfide ions within the steel matrix and FeS destabilize the protective corrosion product layer, prompting further steel corrosion in the $H_2S$—$CO_2$—$H_2O$ system. These occur more prominently under high $H_2S$ concentration or low pH environments [W. Sun, S. Nesic, D. Young and R. Woolam, Equilibrium expressions related to the solubility of the sour corrosion product mackinawite, Industrial & Engineering Chemistry Research 47 (2008) 1738-1742; P. H. Tewari, A. B Campbell, Dissolution of iron during the initial corrosion of carbon steel in aqueous $H_2S$ solutions, Canadian J. Chemistry 57 (1979) 188-196; and G. I. Ogundele, W. E. White, Some Observations on the Corrosion of Carbon Steel in Sour Gas Environments: Effects of $H_2S$ and $H_2S/CO_2/CH_4/C_3H_8$ mixtures, Corrosion 42(7) (1986) 398-408, each incorporated herein by reference in their entirety]. A schematic illustration of sour corrosion chemistry is shown in FIG. 4.

Organic inhibitor compounds are usually added to aggressive environments to slow metal corrosion processes. Unfortunately, many of the corrosion inhibitors deployed for use in oilfield application are toxic and non-biodegradable [D. Darling, R. Rakshpal, Green Chemistry Applied to Corrosion and Scale Inhibitors, NACE International, USA, 1998, incorporated herein by reference in its entirety]. While several other inhibitors, including long chain amide derivatives, have less environmental risk and suitable efficiency, high production costs make them less viable for industrial applications [W. P. Singh, J. O'M. Bockris, Toxicity issues of organic corrosion inhibitors: Applications of QSAR model, The NACE International Annual Conference and Exposition, USA, 1996, incorporated herein by reference in its entirety]. Several low-toxicity organic corrosion inhibitors, such as mercaptoacetic acid derivatives, have poor corrosion inhibition efficiency for use in oilfield environments [U.S. Pat. No. 5,853,619, incorporated herein by reference in its entirety]. Therefore, the formulation of environmentally acceptable, biodegradable and cost-efficient organic corrosion inhibitors for use in aggressive sour environments containing $CO_2$—$H_2S$ mixtures is imperative. Historically, some of the most intensively utilized corrosion inhibitors are film formers based on nitrogen-containing compounds [US Patent Appl. No. 20130233543 A1; U.S. Pat. Nos. 3,629,104; 8,716,199 B2; 4,900,458; and 4,100,099, each incorporated herein by reference in their entirety]. These film formers retard metallic corrosion via adsorption onto metal surfaces, creating inhibitor barriers between the metal surface and the corrosive environment. Multiple classes of nitrogen-based compounds have been reported for use in film formers, including imidazolines, amines and quaternary ammonium salts. Despite these findings, the need remains for a corrosion inhibitor that is environmentally benign, low-cost, and highly effective.

In view of the forgoing, one objective of the present disclosure is to provide ecofriendly corrosion inhibitor formulations containing a substituted benzimidazole, a mercaptocarboxylic acid, a 2-thioxodihydropyrimidine derivative, a sulfhydryl alcohol, and a surfactant. A further objective of the present disclosure is to provide methods for preventing or inhibiting metal corrosion commonly found in oil and gas industries using these formulations.

BRIEF SUMMARY OF THE INVENTION

According to a first aspect, the present disclosure relates to a corrosion inhibitor formulation involving (i) a substituted benzimidazole of formula (I)

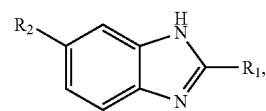

(I)

where $R_1$ is selected from the group consisting of a mercapto, a pyridyl, a carboxyl, an amide, and an aroyl, and $R_2$ is selected from the group consisting of a hydrogen, a mercapto, a hydroxy, a carboxyl, an aroyl, an alkylamino, an amide, an ester, and a cyano, (ii) a mercaptocarboxylic acid, (iii) a 2-thioxodihydropyrimidine-dione, (iv) a sulfhydryl alcohol, (v) a surfactant, and (vi) a solvent, with the proviso that the substituted benzimidazole is structurally different from the mercaptocarboxylic acid.

In one embodiment, the substituted benzimidazole of formula (I) is at least one selected from the group consisting of 2-(2-pyridyl)benzimidazole, 2-(4-methyl-2-pyridyl)-1H-benzimidazole, and 2-(4-ethyl-2-pyridinyl)-1H-benzimidazole.

In one embodiment, the mercaptocarboxylic acid is at least one selected from the group consisting of mercaptoacetic acid, mercaptopropionic acid, mercaptobutanoic acid, 2-sulfanyl-1H-benzimidazole-6-carboxylic acid, and 2-sulfanyl-1H-benzimidazole-5-carboxylic acid.

In one embodiment, the 2-thioxodihydropyrimidine-dione is at least one selected from the group consisting of 2-thiobarbituric acid, 1,3-dimethyl-2-thiobarbituric acid, and 5-benzylidene-2-thiobarbituric acid.

In one embodiment, the sulfhydryl alcohol is at least one selected from the group consisting of 2-mercaptoethanol, 3-mercapto-1-propanol, 1-mercapto-2-propanol, 2-mercapto-3-butanol, and 3-methyl-3-sulfanyl-1-butanol.

In one embodiment, the surfactant is a quaternary ammonium salt.

In one embodiment, the quaternary ammonium salt is at least one selected from the group consisting of cetyltrimethylammonium bromide, cetyltrimethylammonium chloride, tetradecyltrimethylammonium bromide, and tetradecyltrimethylammonium chloride.

In one embodiment, the solvent is at least one selected from the group consisting of isopropanol, butanol, isobutanol, ethylene glycol, propylene glycol, 2-butoxyethanol, and diethylene glycol butyl ether.

In one embodiment, the corrosion inhibitor formulation comprises (i) 10-50 wt % of the substituted benzimidazole of formula (I)

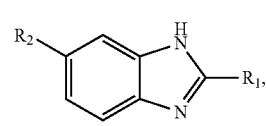

(I)

where $R_1$ is selected from the group consisting of a mercapto, a pyridyl, a carboxyl, an amide, and an aroyl, and $R_2$ is selected from the group consisting of a hydrogen, a mercapto, a hydroxy, a carboxyl, an aroyl, an alkylamino, an amide, an ester, and a cyano, (ii) 3-20 wt % of the mercaptocarboxylic acid, (iii) 3-25 wt % of the 2-thioxodihydropyrimidine-dione, (iv) 3-20 wt % of the sulfhydryl alcohol, (v) 3-15 wt % of the surfactant, and (vi) 25-65 wt % of the solvent, each relative to a total weight of the formulation, with the proviso that the substituted benzimidazole is structurally different from the mercaptocarboxylic acid.

In one embodiment, the corrosion inhibitor formulation comprises (i) 30-40 wt % of the substituted benzimidazole of formula (I)

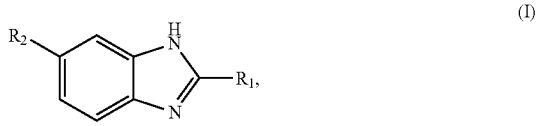

where $R_1$ is selected from the group consisting of a mercapto, a pyridyl, a carboxyl, an amide, and an aroyl, and $R_2$ is selected from the group consisting of a hydrogen, a mercapto, a hydroxy, a carboxyl, an aroyl, an alkylamino, an amide, an ester, and a cyano, (ii) 4-8 wt % of the mercaptocarboxylic acid, (iii) 4-8 wt % of the 2-thioxodihydropyrimidine-dione, (iv) 4-8 wt % of the sulfhydryl alcohol, (v) 4-8 wt % of the surfactant, and (vi) 40-50 wt % of the solvent, each relative to a total weight of the formulation, with the proviso that the substituted benzimidazole is structurally different from the mercaptocarboxylic acid.

According to a second aspect, the present disclosure relates to a method of inhibiting corrosion of a metallic substrate in contact with a corrosive medium. The method involves mixing the corrosion inhibitor formulation of the first aspect with the corrosive medium in contact with the metallic substrate.

In one embodiment, the metallic substrate contains steel.

In one embodiment, the metallic substrate contains carbon steel.

In one embodiment, the corrosive medium contains at least one inorganic acid, at least one inorganic salt, or both.

In one embodiment, the corrosive medium contains at least one of $CO_2$, $H_2S$, and brine.

In one embodiment, the corrosion inhibitor formulation is introduced into the corrosive medium at a concentration of 5-250 ppm.

In one embodiment, the corrosive medium has a temperature in a range of 4-80° C.

In one embodiment, the method has a corrosion inhibition efficiency in a range of 30-98%.

In one embodiment, the corrosion inhibitor formulation imparts a corrosion rate in a range of 0.4-9 mils penetration per year (mpy) to the metallic substrate.

In one embodiment, the metallic substrate is part of a system for oil or gas production, transportation, or refining.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
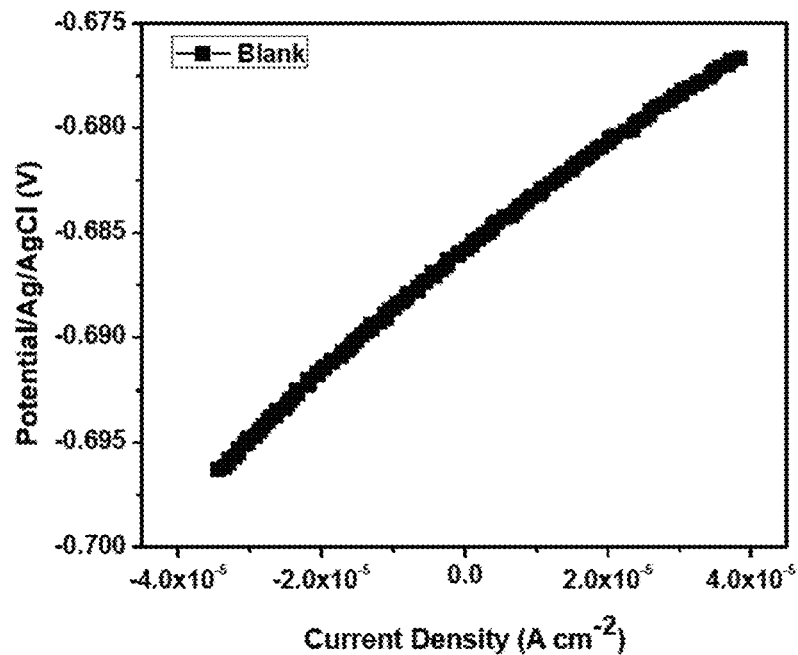
FIG. 1A is a linear polarization resistance (LPR) plot for API 5L X60 steel measured in $CO_2$-saturated brine containing 500 ppm $H_2S$ without any corrosion inhibitor formulation at room temperature.
Figure 1B:
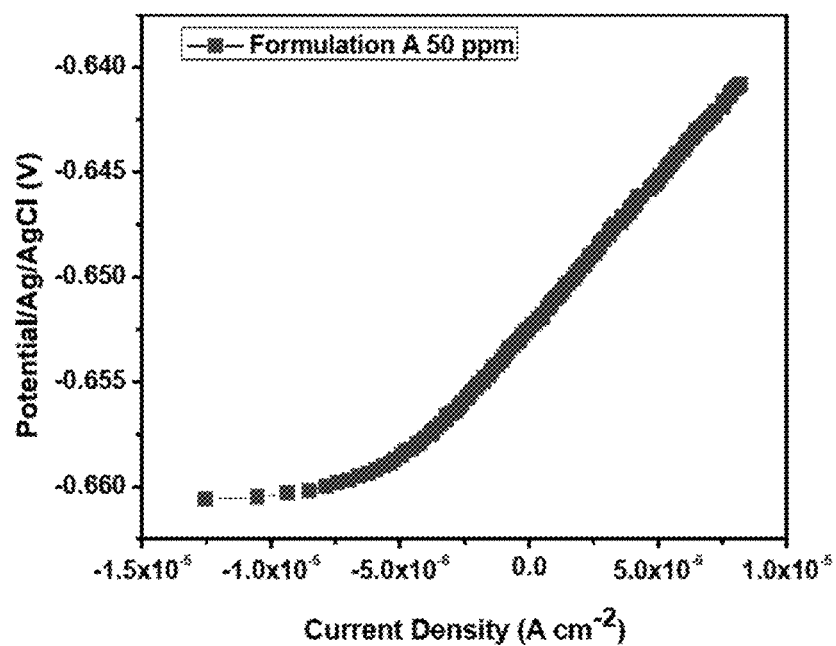
FIG. 1B is a LPR plot for API 5L X60 steel measured in $CO_2$-saturated brine containing 500 ppm $H_2S$ and 50 ppm corrosion inhibitor formulation A at room temperature.
Figure 1C:
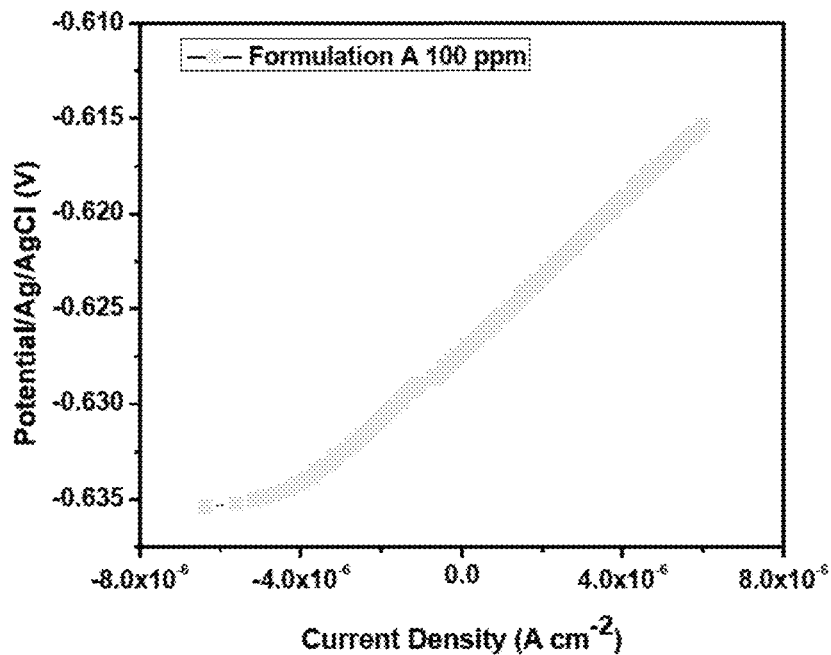
FIG. 1C is a LPR plot for API 5L X60 steel measured in $CO_2$-saturated brine containing 500 ppm $H_2S$ and 100 ppm corrosion inhibitor formulation A at room temperature.
Figure 1D:
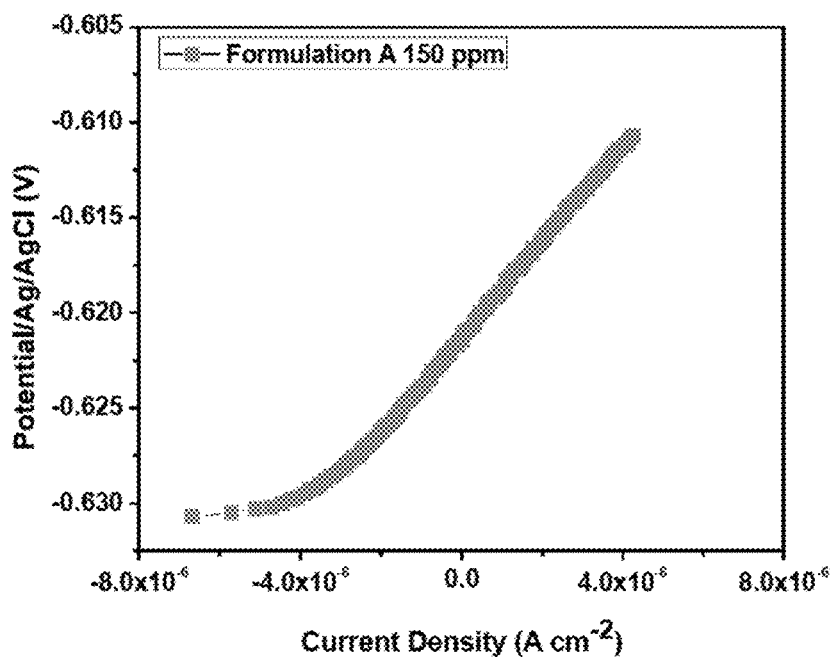
FIG. 1D is a LPR plot for API 5L X60 steel measured in $CO_2$-saturated brine containing 500 ppm $H_2S$ and 150 ppm corrosion inhibitor formulation A at room temperature.
Figure 1E:
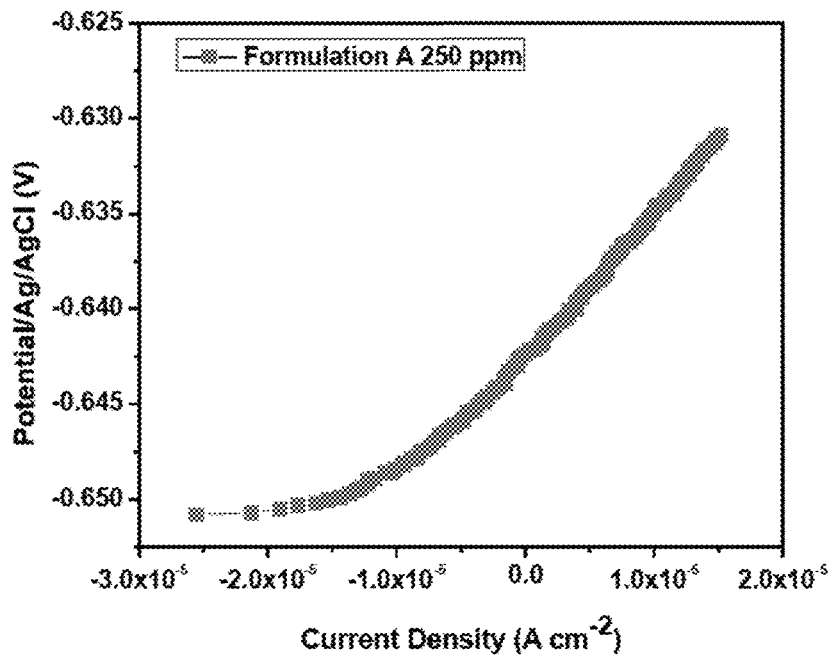
FIG. 1E is a LPR plot for API 5L X60 steel measured in $CO_2$-saturated brine containing 500 ppm $H_2S$ and 250 ppm corrosion inhibitor formulation A at room temperature.
Figure 1F:
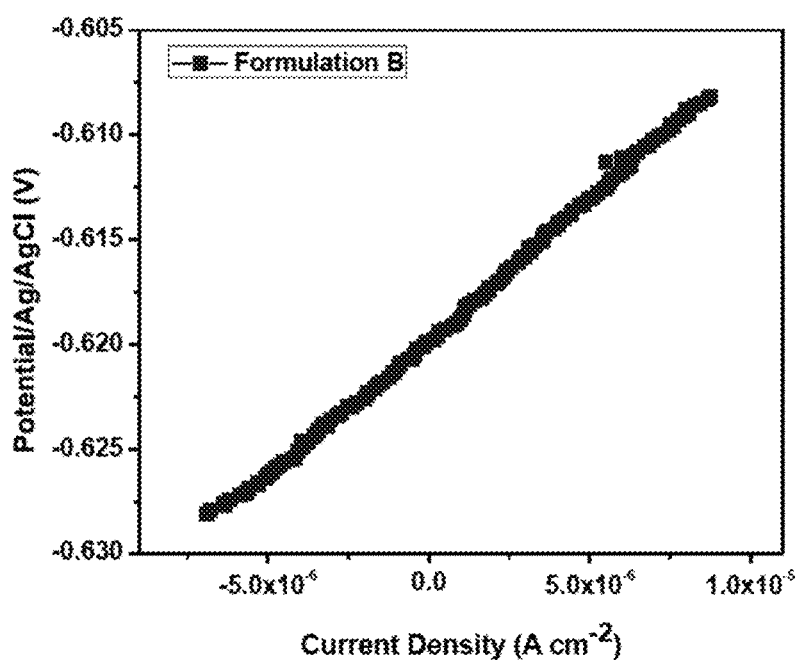
FIG. 1F is a LPR plot for API 5L X60 steel measured in $CO_2$-saturated brine containing 500 ppm $H_2S$ and 50 ppm corrosion inhibitor formulation B at room temperature.
Figure 1G:
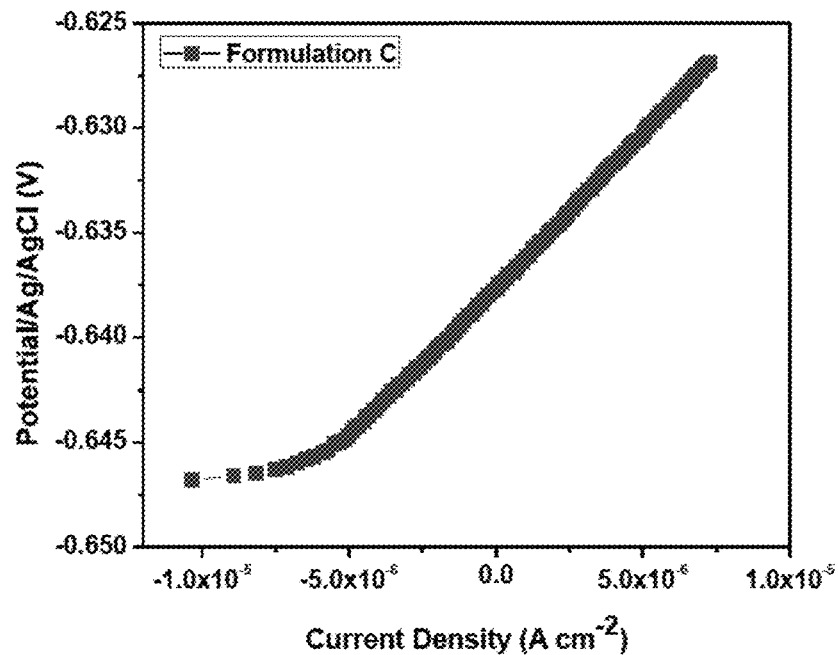
FIG. 1G is a LPR plot for API 5L X60 steel measured in $CO_2$-saturated brine containing 500 ppm $H_2S$ and 50 ppm corrosion inhibitor formulation C at room temperature.
Figure 1H:
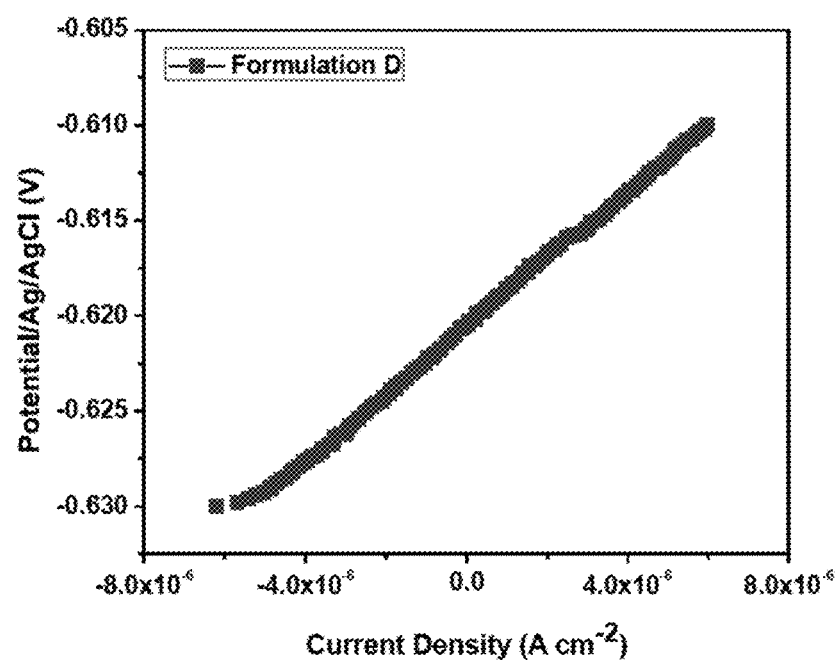
FIG. 1H is a LPR plot for API 5L X60 steel measured in $CO_2$-saturated brine containing 500 ppm $H_2S$ and 50 ppm corrosion inhibitor formulation D at room temperature.
Figure 1I:
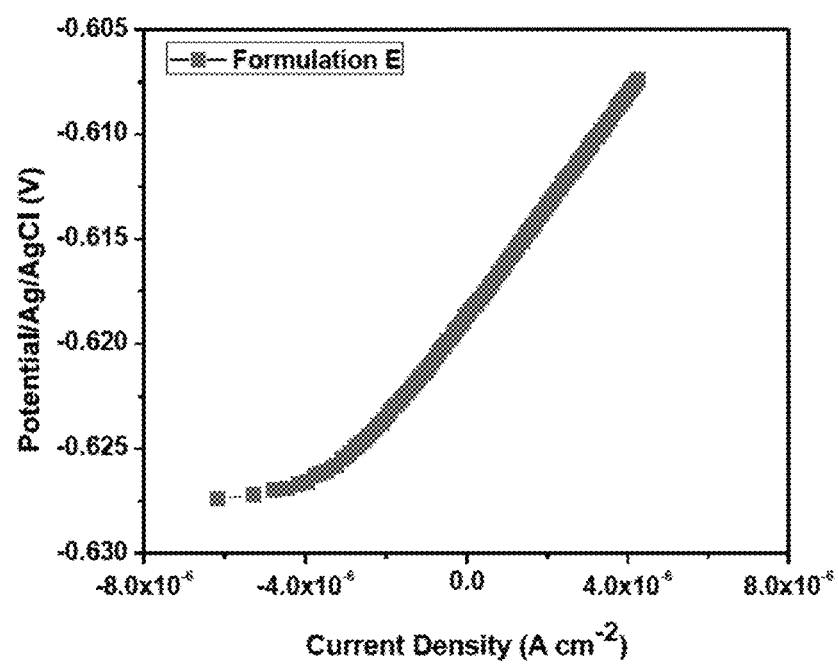
FIG. 1I is a LPR plot for API 5L X60 steel measured in $CO_2$-saturated brine containing 500 ppm $H_2S$ and 150 ppm corrosion inhibitor formulation E at room temperature.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the words "substantially similar", "substantially identical", "approximately", or "about" may be used when describing magnitude and/or position to indicate that the value and/or position described is within a reasonable expected range of values and/or positions. For example, a numeric value may have a value that is ±1% of the stated value (or range of values), ±2% of the stated value (or range of values), ±5% of the stated value (or range of values), ±10% of the stated value (or range of values), or ±15% of the stated value (or range of values).

As used herein, the terms "compound" and "product" are used interchangeably, and are intended to refer to a chemical entity, whether in the solid, liquid or gaseous phase, and whether in a crude mixture or purified and isolated.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxy, alkoxy, oxo, alkanoyl, aryloxy, alkanoyloxy, thiol, alkylthio, arylthio, arylalkylthio, alkylthiono, arylthiono, aryalkylthiono, alkylsulfonyl, arylsulfonyl, arylalkylsulfonyl, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The term "heterocyclyl" refers to a saturated or unsaturated organic group that contains one or more rings in which one or more ring members is a heteroatom, preferably a nitrogen, sulfur, or oxygen heteroatom, such as, for example, thiacyclopentadienyl, thiaindenyl, thianthrenyl, oxacyclopentadienyl, oxaindenyl, isobenzylfuranyl, pyranyl, azacyclopentadienyl, pyridinyl, pyrazinyl, pyrimidinyl, pyridazinyl, indolinyl, quinolinyl, isoquinolinyl, phthalazinyl, cinnolinyl, azafluorenyl, phenanthrolinyl, phenazinyl, phenothiazinyl, phenarsazinyl, isothiazolyl, isoxazolyl, phenoxazinyl, pyrrolidinyl, pyrimadinyl, imidazolidinyl, piperidinyl, piperizinyl, oxathiaanthracenyl, isoxazolyl, oxaazaanthracenyl, isothiazolyl, morpholinyl, and which may, optionally, be substituted at one or more positions with other moieties, such as, for example, any of the possible substituents described above.

The term "aroyl" as used in this disclosure refers to an aromatic carboxylic acyl group includes, for example, benzoyl, 1-naphthoyl, and 2-naphthoyl.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}$C and $^{14}$C, isotopes of nitrogen include $^{15}$N, and isotopes of oxygen include $^{17}$O and $^{18}$O. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

According to a first aspect, the present disclosure relates to a corrosion inhibitor formulation involving (i) a substituted benzimidazole, (ii) a mercaptocarboxylic acid, (iii) a 2-thioxodihydropyrimidine-dione, (iv) a sulfhydryl alcohol, (v) a surfactant, and (vi) a solvent, with the proviso that the substituted benzimidazole is structurally different from the mercaptocarboxylic acid.

In one or more embodiments, the substituted benzimidazole is of formula (I)

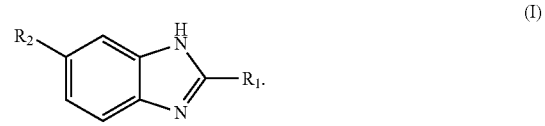

R$_1$ may be a mercapto (i.e. thiol), an alkylthio (e.g. methylthio, ethylthio), an optionally substituted amino (e.g. methylamino, ethylamino), a carboxyl, an amide, an optionally substituted heterocyclyl group (e.g. optionally substituted pyridyl), an azo group, a cyano, a halogen, an optionally substituted aroyl, or some other groups. In a preferred embodiment, R$_1$ is selected from the group consisting of a mercapto (i.e. thiol), an optionally substituted pyridyl, a carboxyl, an amide, and an optionally substituted aroyl. In a most preferred embodiment, R$_1$ is an optionally substituted pyridyl. R$_2$ may be a hydrogen, a mercapto (i.e. thiol), an alkylthio (e.g. methylthio, ethylthio), an optionally substituted amino (e.g. methylamino, ethylamino), a carboxyl, an amide, a cyano, an ester, an optionally substituted aroyl. In a preferred embodiment, R$_2$ is selected from the group consisting of a hydrogen, a mercapto, a hydroxy, a carboxyl, an optionally substituted aroyl, an alkylamino, an amide, an ester, and a cyano.

In preferred embodiments, the substituted benzimidazole of formula (I) is at least one pyridyl-substituted benzimidazole selected from the group consisting of 2-(2-pyridyl)benzimidazole, 2-(4-methyl-2-pyridyl)-1H-benzimidazole, and 2-(4-ethyl-2-pyridinyl)-1H-benzimidazole. Alternatively, other pyridyl-substituted benzimidazoles such as 2-(3-pyridyl)-1H-benzimidazole, 2-(3-pyridinyl)-1H-benzimidazol-5-ylamine, 2-(5-bromopyridin-3-yl)-1H-1,3-benzodiazol-6-amine, 2-pyridin-4-yl-3H-benzoimidazole-5-carboxylic acid, 2-(5-bromo-2-methoxy-3-pyridinyl)-1H-benzimidazole, 2-(2-amino-3-pyridyl)benzimidazole, 6-cyano-2-(2-amino-3-pyridyl)benzimidazole, and 2,6-bis(2-benzimidazolyl)pyridine may be used herein as the substituted benzimidazole. It is equally envisaged that the currently disclosed corrosion inhibitor formulation may be adapted to include a different heterocyclyl substituted benzimidazole such as 6-chloro-5-fluoro-2-(2-pyrazinyl)-1H-benzimidazole in addition to or in lieu of the pyridyl-substituted benzimidazoles.

In one or more embodiments, the substituted benzimidazole of formula (I) is present at an amount of 10 wt %-50 wt %, 15 wt %-45 wt %, 20 wt %-40 wt %, 25 wt %-38 wt %, 28 wt %-35 wt %, or 30 wt %-32 wt % relative to a total weight of the corrosion inhibitor formulation. However, in certain embodiments, the substituted benzimidazole may present at an amount that is less than 10 wt % or greater than 50 wt % relative to a total weight of the corrosion inhibitor formulation.

The mercaptocarboxylic acid of the present disclosure may be any organic molecule having at least one thiol group and at least one carboxyl group attached to a backbone containing 2-18 carbons, 3-15 carbons, 4-12 carbons, 5-10 carbons, or 6-8 carbons, with the proviso that the mercaptocarboxylic acid is structurally different from the aforementioned substituted benzimidazole. Exemplary mercaptocarboxylic acids include, but are not limited to, mercaptoacetic acid (or thioglycolic acid), thiolactic acid, mercaptopropionic acid, 2-mercaptoisobutyric acid, 2-methyl-3-sulfanylpropanoic acid, mercaptobutanoic acid (or 4-mercaptobutyric acid), 6-mercaptohexanoic acid, 5-fluoro-2-mercaptobenzoic acid, 3-mercaptobenzoic acid, 4-mercaptobenzoic acid, thiosalicylic acid, (3-mercapto-5-propyl-4H-1,2,4-triazol-4-yl)acetic acid, 4-(5-sulfanyl-1H-tetraazol-1-yl)benzoic acid, 4-(mercaptomethyl)benzoic acid, 8-mercaptooctanoic acid, 11-mercaptoundecanoic acid, 12-mercaptododecanoic acid, 16-mercaptohexadecanoic acid, 2-sulfanyl-1H-benzimidazole-6-carboxylic acid, 2-sulfanyl-1H-benzimidazole-5-carboxylic acid, mercaptosuccinic acid, and 2,3-dimercaptosuccinic acid. In a preferred embodiment, the mercaptocarboxylic acid is at least one selected from the group consisting of mercaptoacetic acid, mercaptopropionic acid, mercaptobutanoic acid, 2-sulfanyl-1H-benzimidazole-6-carboxylic acid, and 2-sulfanyl-1H-benzimidazole-5-carboxylic acid. In a most preferred embodiment, the mercaptocarboxylic acid is mercaptopropionic acid, 2-sulfanyl-1H-benzimidazole-6-carboxylic acid, or both.

In one or more embodiments, the mercaptocarboxylic acid is present at an amount of 3 wt %-20 wt %, 3.5 wt %-15 wt %, 4 wt %-10 wt %, 4.5 wt %-8 wt %, 5 wt %-7 wt %, or 5.5 wt %-6 wt % relative to a total weight of the corrosion inhibitor formulation. However, in certain embodiments, the mercaptocarboxylic acid may present at an amount that is less than 3 wt % or greater than 20 wt % relative to a total weight of the corrosion inhibitor formulation.

Exemplary 2-thioxodihydropyrimidine-diones that may be used herein in the corrosion inhibitor formulation include, but are not limited to, 2-thiobarbituric acid, 1,3-dimethyl-2-thiobarbituric acid, 1,3-diethyl-2-thiobarbituric acid, 5-(N-phenylcarbamoyl)-2-thiobarbituric acid, 5-ethyl-5-(1-methylbutyl)-2-thiobarbituric acid, 5-allyl-5-(1-methylbutyl)-2-thiobarbituric acid, 5-benzylidene-2-thiobarbituric acid, 5-(3-pyridylmethylene)-2-thiobarbituric acid, 5-picolinylidene-2-thiobarbituric acid, 5-vanillylidene-2-thiobarbituric acid, 5-(O-vanillylidene)-2-thiobarbituric acid, 5-ethyl-2-thiobarbituric acid, 5-butyl-2-thiobarbituric acid, 5-furfurylidene-2-thiobarbituric acid, 5-piperonylidene-2-thiobarbituric acid, 5-(2-hydroxyethyl)5-isopentyl-2-thiobarbituric acid, 5-(4-(dimethylamino)benzylidene)-2-thiobarbituric acid, and 5-ethyl-5-(2-methylallyl)-2-thiobarbituric acid. In a preferred embodiment, the 2-thioxodihydropyrimidine-dione is at least one selected from the group consisting of 2-thiobarbituric acid, 1,3-dimethyl-2-thiobarbituric acid, and 5-benzylidene-2-thiobarbituric acid.

In one or more embodiments, the 2-thioxodihydropyrimidine-dione is present at an amount of 3 wt %-25 wt %, 3.5 wt %-20 wt %, 4 wt %-15 wt %, 4.5 wt %-12 wt %, 5 wt %-10 wt %, or 5.5 wt %-8 wt % relative to a total weight of the corrosion inhibitor formulation. However, in certain embodiments, the 2-thioxodihydropyrimidine-dione may present at an amount that is less than 3 wt % or greater than 25 wt % relative to a total weight of the corrosion inhibitor formulation.

The sulfhydryl alcohol of the present disclosure may be any organic molecule having at least one thiol group and at least one hydroxy group attached to a backbone containing 2-15 carbons, 2-12 carbons, 3-10 carbons, or 4-8 carbons. The sulfhydryl alcohol of the present disclosure may be used to produce films on metallic substrates that are resilient to the high wall shear stress common in oil and gas production systems. In a preferred embodiment, the sulfhydryl alcohol is devoid of any carboxyl group. In another preferred embodiment, the sulfhydryl alcohol is devoid of any benzimidazole functionality. Exemplary sulfhydryl alcohols include, but are not limited to, 5-mercapto-4H-[1,2,4]triazol-3-ol, 2-mercaptoethanol, 3-mercapto-1-propanol, 1-mercapto-2-propanol, 2,3-dimercapto-1-propanol, 2-mercapto-3-butanol, 3-methyl-3-sulfanyl-1-butanol, 4-ethyl-5-mercapto-4H-1,2,4-triazol-3-ol, 2-mercaptophenol, 3-mercaptophenol, 4-mercaptophenol, 3-mercapto-1-hexanol, 4-mercapto-4-methylpentan-2-ol, 6-mercapto-1-hexanol, 5-fluoro-2-mercaptobenzyl alcohol, 2-mercaptobenzyl alcohol, 8-mercapto-1-octanol, 9-mercapto-1-nonanol. In a preferred embodiment, the sulfhydryl alcohol has a linear carbon backbone, for example, the sulfhydryl alcohol may be 2-mercaptoethanol, 3-mercapto-1-propanol, 6-mercapto-1-hexanol, 8-mercapto-1-octanol, 9-mercapto-1-nonanol, or a mixture thereof. In one or more embodiments, the sulfhydryl alcohol is at least one selected from the group consisting of 2-mercaptoethanol, 3-mercapto-1-propanol, 1-mercapto-2-propanol, 2-mercapto-3-butanol, and 3-methyl-3-sulfanyl-1-butanol. In a most preferred embodiment, the sulfhydryl alcohol is 2-mercaptoethanol, 3-mercapto-1-propanol, or both.

In one or more embodiments, the sulfhydryl alcohol is present at an amount of 3 wt %-20 wt %, 3.5 wt %-15 wt %, 4 wt %-10 wt %, 4.5 wt %-8 wt %, 5 wt %-7 wt %, or 5.5 wt %-6 wt % relative to a total weight of the corrosion inhibitor formulation. However, in certain embodiments, the sulfhydryl alcohol may present at an amount that is less than 3 wt % or greater than 20 wt % relative to a total weight of the corrosion inhibitor formulation.

As used herein, "surfactant" is assigned its conventional meaning as a compound that lowers the surface tension (or interfacial tension) between two liquids or between a liquid and a solid and which can act as detergents, wetting agents, emulsifiers, foaming agents, and dispersants. Suitable surfactants include, but are not limited to, anionic surfactants, cationic surfactants, amphoteric (zwitterionic) surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkyl polyethylene glycol esters and diesters. Also included are betaines and sultanes, amphoteric surfactants such as alkyl amphoacetates and amphodiacetates, alkyl amphopropipionates and amphodipropionates, and alkyliminodipropionate.

Quaternary ammonium salts are compounds containing a positively charged central nitrogen atom with four substituents, especially alkyl and/or aryl groups, discounting hydrogen. In one or more embodiments, the surfactant of the present disclosure is a quaternary ammonium salt. Quaternary ammonium salts used herein may also function as a disinfectant in the corrosion inhibition formulation. Non-limiting examples of quaternary ammonium compounds include alkyl benzyl ammonium chloride, benzyl cocoalkyl ($C_{12}$-$C_{18}$) dimethylammonium chloride, dicocoalkyl ($C_{12}$-$C_{18}$) dimethylammonium chloride, ditallow dimethylammonium chloride, di(hydrogenated tallow alkyl)dimethyl quaternary ammonium methyl chloride, methyl bis(2-hydroxyethyl cocoalkyl ($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, cetyltrimethylammonium bromide, cetyltrimethylammonium chloride, tetradecyltrimethylammonium bromide, tetradecyltrimethylammonium chloride, n-dodecyltrimethylammonium sulfate, soya alkyltrimethylammonium chloride, and hydrogenated tallow alkyl (2-ethylhexyl) dimethyl quaternary ammonium methyl sulfate. In a preferred embodiment, the surfactant is at least one selected from the group consisting of cetyltrimethylammonium bromide, cetyltrimethylammonium chloride, tetradecyltrimethylammonium bromide, and tetradecyltrimethylammonium chloride. In a most preferred embodiment, the surfactant used herein is cetyltrimethylammonium bromide, tetradecyltrimethylammonium bromide, or both.

In one or more embodiments, the surfactant is present at an amount of 3 wt %-15 wt %, 3.5 wt %-12 wt %, 4 wt %-10 wt %, 4.5 wt %-8 wt %, 5 wt %-7 wt %, or 5.5 wt %-6 wt % relative to a total weight of the corrosion inhibitor formulation. However, in certain embodiments, the surfactant may present at an amount that is less than 3 wt % or greater than 15 wt % relative to a total weight of the corrosion inhibitor formulation.

Exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. In one embodiment, the solvent of the corrosion inhibitor formulation disclosed herein is miscible with water. Exemplary water-miscible solvents include, but are not limited to, acetone, acetonitrile, methanol, ethanol, 1-propanol, isopropanol, t-butyl alcohol, 1,3-propanediol, 1,5-pentanediol, 1,2-butanediol, 1,3-butanediol, 1,4-butanediol, dimethylformamide (DMF), diethanolamine, diethylenetriamine, methyl diethanolamine, dimethoxyethane, diethylene glycol dimethyl ether, 1,2-dimethoxy-ethane (DME), 1,4-dioxane, ethylene glycol, propylene glycol, glycerol, tetrahydrofuran, and dimethyl sulfoxide. In a preferred embodiment, the solvent is at least one selected from the group consisting of isopropanol, butanol, isobutanol, ethylene glycol, propylene glycol, 2-butoxyethanol, and diethylene glycol butyl ether. Certain solvents such as 2-butoxyethanol, and diethanolamine may generally function as a secondary surfactant. However, in at least one embodiment, the surfactant and the solvent described herein have distinct chemical structures.

In one or more embodiments, the solvent is present at an amount of 25 wt %-65 wt %, 30 wt %-60 wt %, 32 wt %-58 wt %, 35 wt %-55 wt %, 38 wt %-52 wt %, 40 wt %-50 wt %, 42 wt %-48 wt %, or about 45 wt % relative to a total weight of the corrosion inhibitor formulation. However, in certain embodiments, the solvent may present at an amount that is less than 25 wt % or greater than 65 wt % relative to a total weight of the corrosion inhibitor formulation.

In some embodiments, the corrosion inhibitor formulation disclosed herein in any of its embodiments comprises (i) 10-50 wt %, 15-45 wt %, 20-40 wt %, 25-38 wt %, 28-35 wt %, or 30-32 wt % of the substituted benzimidazole of formula (I)

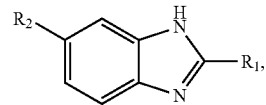

where $R_1$ is selected from the group consisting of a mercapto, a pyridyl, a carboxyl, an amide, and an aroyl, and $R_2$ is selected from the group consisting of a hydrogen, a mercapto, a hydroxy, a carboxyl, an aroyl, an alkylamino, an amide, an ester, and a cyano, (ii) 3-20 wt %, 3.5-15 wt %, 4-10 wt %, 4.5-8 wt %, 5-7 wt %, or 5.5-6 wt % of the mercaptocarboxylic acid, (iii) 3-25 wt %, 3.5-20 wt %, 4-15 wt %, 4.5-12 wt %, 5-10 wt %, or 5.5-8 wt % of the 2-thioxodihydropyrimidine-dione, (iv) 3-20 wt %, 3.5-15 wt %, 4-10 wt %, 4.5-8 wt %, 5-7 wt %, or 5.5-6 wt % of the sulfhydryl alcohol, (v) 3-15 wt %, 3.5-12 wt %, 4-10 wt %, 4.5-8 wt %, 5-7 wt %, or 5.5-6 wt % of the surfactant, and (vi) 25-65 wt %, 30 wt %-60 wt %, 32 wt %-58 wt %, 35 wt %-55 wt %, 38 wt %-52 wt %, 40 wt %-50 wt %, 42 wt %-48 wt %, or about 45 wt % of the solvent, each relative to a total weight of the formulation, with the proviso that the substituted benzimidazole is structurally different from the mercaptocarboxylic acid.

In one or more embodiments, the corrosion inhibitor formulation disclosed herein comprises (i) 30-40 wt %, preferably 32-38 wt %, more preferably 34-36 wt %, or about 35 wt % of the substituted benzimidazole of formula (I)

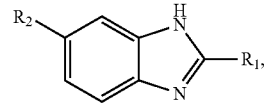

where $R_1$ is selected from the group consisting of a mercapto, a pyridyl, a carboxyl, an amide, and an aroyl, and $R_2$ is selected from the group consisting of a hydrogen, a mercapto, a hydroxy, a carboxyl, an aroyl, an alkylamino, an amide, an ester, and a cyano, (ii) 4-8 wt %, preferably 4.5-7 wt %, more preferably 4.8-6 wt %, or about 5 wt % of the mercaptocarboxylic acid, (iii) 4-8 wt %, preferably 4.5-7 wt %, more preferably 4.8-6 wt %, or about 5 wt % of the 2-thioxodihydropyrimidine-dione, (iv) 4-8 wt %, preferably 4.5-7 wt %, more preferably 4.8-6 wt %, or about 5 wt % of the sulfhydryl alcohol, (v) 4-8 wt %, preferably 4.5-7 wt %, more preferably 4.8-6 wt %, or about 5 wt % of the surfactant, and (vi) 40-50 wt %, preferably 42-48 wt %, more preferably 44-46 wt %, or about 45 wt % of the solvent, each relative to a total weight of the formulation, with the proviso that the substituted benzimidazole is structurally different from the mercaptocarboxylic acid.

In a preferred embodiment, the corrosion inhibitor formulation disclosed herein comprises (i) 30-40 wt %, preferably 32-38 wt %, more preferably 34-36 wt %, or about 35 wt % of a pyridyl-substituted benzimidazole which is at least one selected from the group consisting of 2-(2-pyridyl)benzimidazole, 2-(4-methyl-2-pyridyl)-1H-benzimidazole, and 2-(4-ethyl-2-pyridinyl)-1H-benzimidazole, (ii) 4-8 wt %, preferably 4.5-7 wt %, more preferably 4.8-6 wt %, or about 5 wt % of a mercaptocarboxylic acid which is mercaptopropionic acid, 2-sulfanyl-1H-benzimidazole-6-carboxylic acid, or both, (iii) 4-8 wt %, preferably 4.5-7 wt %, more preferably 4.8-6 wt %, or about 5 wt % of a 2-thioxodihydropyrimidine-dione which is at least one selected from the group consisting of 2-thiobarbituric acid, 1,3-dimethyl-2-thiobarbituric acid, and 5-benzylidene-2-thiobarbituric acid, (iv) 4-8 wt %, preferably 4.5-7 wt %, more preferably 4.8-6 wt %, or about 5 wt % of a sulfhydryl alcohol which is 2-mercaptoethanol, 3-mercapto-1-propanol, or both, (v) 4-8 wt %, preferably 4.5-7 wt %, more preferably 4.8-6 wt %, or about 5 wt % of a surfactant which is at least one selected from the group consisting of cetyltrimethylammonium bromide, cetyltrimethylammonium chloride, tetradecyltrimethylammonium bromide, and tetradecyltrimethylammonium chloride, and (vi) 40-50 wt %, preferably 42-48 wt %, more preferably 44-46 wt %, or about 45 wt % of a solvent which is at least one selected from the group consisting of isopropanol, butanol, isobutanol, ethylene glycol, propylene glycol, 2-butoxyethanol, and diethylene glycol butyl ether.

"Toxicity" may be measured based on administration of an oral, dermal, inhaled amount of a compound. Toxicity may be measured using bioassays to measure death rates in order to quantify the effect of the toxin. Such measures are commonly known as $LD_{50}$ and $LC_{50}$. The $LD_{50}$ is defined as the lethal dose at which 50% of the population if killed in a given period of time; an $LC_{50}$ is the lethal concentration required to kill 50% of the population. The $LC_{50}$ is a measure, e.g. in mg/L, of the concentration of the toxin.

Preferably, the substituted benzimidazole or other ingredients (e.g. mercaptocarboxylic acid, 2-thioxodihydropyrimidine-dione, surfactant) incorporated into the corrosion inhibition formulation are not toxic, for example, the $LC_{50}$ of the substituted benzimidazole is no more than 100, 200, 300, 400, 500, or 1,000 mg/L. In some embodiments, the substituted benzimidazole of the present disclosure is less toxic than a heterocyclic compound present in a conventional anticorrosion formulation.

In one embodiment, the corrosion inhibition formulation may be in the form of a kit or device containing separate components that are mixed with or incorporated into a solution (such as into an aqueous solution or a corrosive medium containing water and/or corrosive agents). In some embodiments, the corrosion inhibition formulation may be prepared in a concentrated or anhydrous form that can later be mixed with, incorporated into, or injected into, water or another aqueous solution or medium. It may be in the form of a solution, emulsion, suspension, gel, unguent, or lubricant. In a preferred embodiment, the corrosion inhibition formulation in any aforementioned form is useful in preventing or ameliorating corrosion, especially of ferrous metals, or for removing corrosion or other deposits from systems containing components subject to corrosion.

The corrosion inhibitor formulation of the present disclosure in any of its embodiments may be prepared by mixing the aforementioned components (e.g. the substituted benzimidazole, the mercaptocarboxylic acid, the 2-thioxodihydropyrimidine-dione, the sulfhydryl alcohol, the surfactant, the solvent), thereby forming the formulation. The components may be added together in any order. The mixing process according to the present disclosure may be performed in any conventional vessel. In a preferred embodiment, mixings are performed in a high speed double-mounted turbine dissolver. Methods of agitation include, but are not limited to, using a propeller, using an agitator, a vortexer, a rotary shaker, a magnetic stirrer, an overhead stirrer, an ultrasonic probe, and a pump.

According to a second aspect, the present disclosure relates to a method of inhibiting corrosion of a metallic substrate in contact with a corrosive medium. The method involves mixing the corrosion inhibitor formulation of the first aspect in any of its embodiments with the corrosive medium in contact with the metallic substrate. Alternatively, the method may involve contacting and/or coating the metallic substrate with the corrosion inhibitor formulation prior to immersion into a corrosive environment. Preferably, the corrosion inhibitor formulation will be contacted with, or continuously or intermittently applied to, the surfaces of metallic substrates, preferably in a space or volume where continued contact between the metallic substrate and the corrosion inhibition formulation can be maintained or refreshed.

As used herein, "corrosion" refers to the process which converts refined metals to their more stable oxide. It is the gradual loss of a material (usually metals) by chemical reaction with their environment. Commonly, this means electrochemical oxidation of metal in reaction with an oxidant such as oxygen. Rusting, the formation of iron oxides is a well-known example of electrochemical corrosion producing oxide(s) and/or salt(s) of the original metal. Corrosion degrades the useful properties of materials and structures including strength, appearance and permeability to liquids and gases. Many structural alloys corrode merely from exposure to moisture in air, but the process can be strongly affected by exposure to certain substances. Because corrosion is a diffusion-controlled process, it generally occurs on exposed surfaces.

Exemplary metallic substrates applicable to the present disclosure include, but are not limited to, copper, copper alloys (e.g. brass or bronze), aluminum, aluminum alloys (e.g. aluminum-magnesium, nickel-aluminum, aluminum-silicon), nickel, nickel alloys (e.g. nickel-titanium or nickel-chromium), iron, iron alloys, carbon steels, alloy steels, stainless steels, and tool steels.

Steel is an alloy of iron and carbon that is widely used in construction and other applications because of its high tensile strength and low cost. Carbon, other elements, and inclusions within iron act as hardening agents that prevent the movement of dislocations that naturally exist in the iron atom crystal lattices. The carbon in typical steel alloys may contribute up to 2.1% of its weight.

Steels can be broadly categorized into four groups based on their chemical compositions: carbon steels, alloy steels, stainless steels, and tool steels. Carbon steels contain trace amounts of alloying elements and account for 90% of total steel production. Carbon steels can be further categorized intro three groups depending on their carbon content: low carbon steels/mild steels contain up to 0.3% carbon, medium carbon steels contain 0.3-0.6% carbon, and high carbon steels contain more than 0.6% carbon. Alloys steels contain alloying elements (e.g. manganese, silicon, nickel, titanium, copper, chromium and aluminum) in varying proportions in order to manipulate the steel's properties, such as its hardenability, corrosion resistance, strength, formability, weldability or ductility. Stainless steels generally contain between 10-20% chromium as the main alloying element and are valued for high corrosion resistance. With over 11% chromium, steel is about 200 times more resistant to corrosion than mild steel. These steels can be divided into three groups based on their crystalline structure: austenitic steels, ferritic steels and martensitic steels. Tool steels contain tungsten, molybdenum, cobalt and vanadium in varying quantities to increase heat resistance and durability, making them ideal for cutting and drilling equipment.

In one embodiment, the metallic substrate comprises steel, carbon steel, low carbon steel, mild steel, medium carbon steel, high carbon steel, alloy steel, stainless steel, austenitic steel, ferritic steel, martensitic steel, tool steel, or mixtures thereof. Preferably, the metallic substrate comprises carbon steel. Most preferably the metallic substrate is a carbon steel with a carbon content of 0.2-1.0%, for example, API 5L X grade steel such as X52, X56, X60, X65, X70 to X120, N-80, J55, P-110, T-95, C1018, QT 800, and HS80, and other steel alloys such as 13Cr, 25Cr, Inconel 825, and 316 L.

As used herein, "systems" include, but are not limited to, systems used in petroleum (e.g., crude oil and its products) or natural gas production, such as well casing, transport pipelines, drilling and other oil field applications, transport, separation, refining, storage, and other liquid natural gas and petroleum-related applications, geothermal wells, water wells; cooling water systems including open recirculating, closed, and once-through systems; cisterns and water collection or holding systems, solar water heating systems, boilers and boiler water systems or systems used in power generation, mineral process waters including mineral washing, flotation and benefaction; paper mill digesters, washers, bleach plants, white water systems and mill water systems; black liquor evaporators in the pulp industry; gas scrubbers and air washers; continuous casting processes in the metallurgical industry; air conditioning and refrigeration systems; building fire protection heating water, such as pasteurization water; water reclamation and purification systems; membrane filtration water systems; food processing streams and waste treatment systems as well as in clarifiers, liquid-solid applications, municipal sewage treatment systems; and industrial or municipal water distribution systems.

In preferred embodiments, the metallic substrate is part of a system for oil or gas production, transportation, or refining. The metallic substrate may be part of a system used in the drilling, petroleum, oil and gas industries including drills, drill bits, pumps, compressors, pipelines, and other tools and equipment, electric parts such as transformers, power generators and electric motors, vehicle parts including those of boats, autos, trucks, aircraft, and military vehicles. Tools, including construction, automotive, household, and kitchen tools, are included.

As used herein, a "corrosion inhibitor" refers to a chemical compound or composition that when added to a material and/or contacted with a corrodible substrate, typically a metal or an alloy, decreases the corrosion rates of the material. Inhibitors often play an important role in the oil extraction and processing industries where they have always been considered to be the first line of defense against corrosion. Cathodic corrosion inhibitors prevent the occurrence of the cathodic reaction of the metal. These inhibitors have metal ions able to produce a cathodic reaction due to alkalinity, thus producing insoluble compounds that may precipitate selectively on cathodic sites. This may deposit over the metal a compact and adherent film that restricts the diffusion of reducible species in these areas. This may increase the impedance of the surface and the diffusion restriction of the reducible species, that is, the oxygen diffusion and electrons conductive in these areas. Anodic inhibitors (also referred to as passivation inhibitors) act by reducing anodic reaction, blocking the anode reaction and supporting the natural reaction of passivation metal surface, they may also act by forming a film adsorbed on the metal. In general, the inhibitors react with the corrosion product, initially formed, resulting in a cohesive and insoluble film on the metal surface.

Inhibition of metal corrosion by organic inhibitors is influenced by the presence of heteroatoms (N, O, and S) as the inhibitor molecules interfere with anodic and/or cathodic reactions occurring on the metal surfaces thus arresting or minimizing corrosion processes. Organic inhibitor that contains oxygen, nitrogen, and/or sulfur may be adsorbed on a metallic surface thus blocking the active corrosion sites. The corrosion inhibitor formulation disclosed herein may be regarded as a mixed type inhibitor having both cathodic and anodic mechanisms of action and providing corrosion protection by blocking both cathodic and anodic sites.

The effectiveness of a corrosion inhibitor may depend on fluid composition, quantity of fluid and flow regime. The nature of a corrosion inhibitor may depend on the material being protected (most commonly metal objects) and the corrosive agent(s) in a corrosive medium to be neutralized.

As used herein, "parts per million" or "ppm" refers to an expression of concentration by mass or weight. For example, 1 ppm of a corrosion inhibitor formulation denotes a 1:1,000,000 weight ratio of corrosion inhibitor formulation per total weight of fluid (e.g. liquids, gases or combinations thereof) contacting the metallic substrate. Alternatively, 1 ppm of a corrosion inhibitor formulation denotes a 1:1,000,000 weight ratio of the corrosion inhibitor per total weight of fluid contained or carried within oil and gas infrastructure having the metallic substrates.

The corrosion inhibitor formulation disclosed herein in any its embodiments may be effective in protecting the aforementioned metallic substrate against corrosion in various environments such as acidic and high salt concentration environments. In one or more embodiments, the corrosive medium contains at least one inorganic acid, at least one inorganic salt, or both. Inorganic acids may be in liquid or gas forms and include acids such as HCl, $H_2SO_4$, $HNO_3$, $CO_2$, and $H_2S$. These inorganic acidic agents may be present in the corrosive medium at saturated concentrations, or at a concentration in a range of 1-2,000 ppm, 10-1,500 ppm, 100-1,000 ppm, 250-800 ppm, 400-700 ppm, or about 500 ppm. Inorganic salts such as sodium chloride have been known to cause serious corrosion to steels. As used herein, brine is an aqueous mixture of one or more soluble salts (e.g. sodium chloride, potassium chloride, calcium chloride, calcium bromide, sodium bromide, potassium bromide, zinc bromide, magnesium chloride). Seawater or water from a salt lake may be considered a brine. In some embodiments, brine may be present in the corrosive medium. For example, the corrosive medium may contain 1-10 wt %, 2-5 wt %, or about 3.5 wt % sodium chloride, 0.1-1 wt %, 0.2-0.5 wt %, or about 0.3 wt % calcium chloride, as well as 0.05-1 wt %, 0.1-0.4 wt %, or about 0.2 wt % magnesium chloride, each relative to a total weight of the corrosive medium. In one or more embodiments, the corrosive medium contains at least one of $CO_2$, $H_2S$, and brine. In at least one embodiment, the corrosive medium contains both $CO_2$ and $H_2S$. In at least one embodiment, the corrosive medium contains $CO_2$, $H_2S$, and brine.

In one or more embodiments, the method disclosed herein involves introducing the corrosion inhibitor formulation into the corrosive medium at a concentration of 5-250 ppm, 10-200 ppm, 25-150 ppm, 50-125 ppm, or 75-100 ppm. However, in certain embodiments, the corrosion inhibitor formulation may be introduced into the corrosive medium at a concentration less than 5 ppm or greater than 250 ppm.

Preferably, for applications in the oil and gas industry, the corrosion inhibitor formulations of the present invention are stable at high temperatures. Oil and gas wells can reach temperatures higher than 120° C. (e.g. 130-140° C.). In one or more embodiments, the corrosive medium has a temperature in a range of 4-150° C., 10-120° C., 20-100° C., 30-80° C., 40-70° C., or 50-60° C.

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight during reference time), area (initial surface area), time (length of reference time) and density. Corrosion rate is typically computed using mils per year (mpy). Mils penetration per year (mpy) is a unit of measurement equal to approximately one thousandth of an inch. The unit is typically applied in industries like manufacturing and engineering to measure coating thickness or tolerance. Mils penetration per year is commonly referred to as mil in the U.S. measurement system.

In one or more embodiments, the corrosion inhibitor formulation of the present disclosure in any of its embodiments imparts a corrosion rate in a range of 0.4-9 mils penetration per year (mpy) to the metallic substrate, preferably 0.5-8 mpy, preferably 0.6-7 mpy, preferably 0.7-6 mpy, preferably 0.8-5 mpy, preferably 0.9-4 mpy, preferably 1-3 mpy, preferably 1.5-2 mils penetration per year (mpy). In one embodiment, the corrosion rate of the metallic substrate is determined according to ASTM G59-97. In a preferred embodiment, the corrosion rate of the metallic substrate according to the presently disclosed method may be slowed by 3-15 mpy relative to the corrosion rate of a substantially identical metallic substrate exposed to a substantially identical corrosive medium lacking the corrosion inhibitor formulation, preferably slowed by 4-12 mpy, 5-10 mpy, or 6-8 mpy relative to the corrosion rate of a substantially identical metallic substrate exposed to a substantially identical corrosive medium lacing the corrosion inhibitor formulation (see Tables 2 and 3).

Corrosion inhibition efficiencies may be measured with the Tafel extrapolation, linear polarization resistance (LPR), potentiodynamic polarization (PDP), gravimetric or other similar methods. In a preferred embodiment, the method described herein in any of its embodiments achieves a corrosion inhibition efficiency in a range of 30-98%, 40-96%, 50-95%, 60-94%, 70-93%, 80-92%, or 85-90%. In one embodiment, the corrosion inhibition efficiency of the method disclosed herein is determined according to ASTM G102-89.

In a preferred embodiment, the method disclosed herein has a corrosion inhibition efficiency in a range of 75-99% when the corrosion inhibitor formulation is introduced to the corrosive medium at a concentration ranging from 50-240 ppm, preferably a corrosion inhibition efficiency greater than 90% at a concentration of up to 200 ppm, preferably greater than 90% at a concentration of up to 175 ppm, preferably greater than 90% at a concentration of up to 150 ppm, preferably greater than 90% at a concentration of up to 125 ppm, preferably greater than 90% at a concentration of up to 100 ppm, preferably greater than 90% at a concentration of up to 75 ppm, preferably greater than 90% at a concentration of up to 50 ppm.

The examples below are intended to further illustrate protocols for preparing and characterizing the corrosion inhibition formulations, and uses thereof, and are not intended to limit the scope of the claims.

Example 1

Formulations

The inhibitor formulation in the present disclosure comprises an azole motif with the general formula shown below:

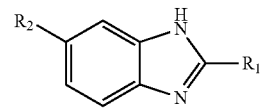

wherein $R_1$ is a mercapto group, a carboxylate group, an aromatic amide group, a thiol group, a nitrile group, an azo group, a pyridyl group, a bromophenyl group, or a sulfonic acid group, etc. Examples of $R_1$ include, but are not limited to, 2-mercapto, 2-pyridyl, 2-(bromomethyl)pyridyl, and pyridine-2-aldoxime, etc. $R_2$ is a hydrogen, a mercapto group, a carboxylate group, an aromatic carbonyl, a hydroxy group, a methyl amino group, an amide group, or an ester group, etc. The constituents of the formulation in the present disclosure are environmentally friendly with minimal toxicity. Especially, the azole derivatives used in the present disclosure are important ingredients in many biological, chemical, and pharmaceutical products. The formulation disclosed herein can be effectively applied at low dosage levels between 50 to 250 ppm for corrosion inhibition in highly aggressive oil well aqueous fluids containing acetic acid, $CO_2$, $H_2S$, and oil field brine.

In general, the corrosion inhibitor formulation contains:
(a) 15-50 wt. % of an azole derivative having carboxylate, mercapto, amide, thiol, pyridyl, and/or aromatic carbonyl groups, etc. as di-substituents at 2- and 6-positions;
(b) 5-25 wt. % of one or more mercapto carboxylic acid derivatives;
(c) 5-15 wt. % of one or more dihydropyrimidine derivatives. The dihydropyrimidine derivative is an important constituent of anti-convulsive and anti-hepatitis drugs. The dihydropyrimidine has a general structure as shown below:

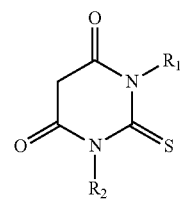

where $R_1$ and $R_2$ are hydrogen or $C_1$-$C_3$ (but not exceeding $C_3$) alkyl groups. Examples of the dihydropyrimidine derivative include 2-thiobarbituric acid, 1,3-dimethyl-2-thiobarbituric acid, 5-benzylidene-2-thiobarbituric acid, and derivatives thereof;
(d) 5-25 wt. % of one or more linear sulfhydryl alcohols;
(e) 5-15 wt. % of at least one surfactant, preferably, one or more quaternary ammonium compounds; and
(f) 25-60 wt. % of an alcohol as solvent.

Example 2

Corrosion Testing Using the Rotating Cylinder Electrode (RCE)

The corrosion testing was performed on API 5L X60 carbon steel cylindrical sample as a working electrode with an exposed area of 3.14 cm². Prior to testing, the steel sample was polished down to 800 grit size using waterproof SiC paper followed by thorough washing with distilled water, cleaning with alcohol, acetone, and distilled water. Five different inhibitor formulations have been presented and designated as Formulations A to E (Table 1).

TABLE 1

Composition of corrosion inhibitor formulations

| Corrosion inhibitor | Weight % | | | | |
|---|---|---|---|---|---|
| formulations | A | B | C | D | E |
| Azole derivative | 10 | 25 | 30 | 35 | 35 |
| Mercapto carboxylic acid derivative | 5 | 10 | 10 | 5 | 5 |
| Dihydropyrimidine derivative | 15 | 10 | 5 | 5 | 10 |
| Sulfhydryl alcohol | 5 | 5 | 10 | 5 | 5 |
| Surfactants | 5 | 5 | 5 | 5 | 10 |
| Alcohol | 60 | 45 | 40 | 45 | 35 |

The formulations were prepared with analytical grade reagents procured from Sigma Aldrich, USA. Formulation A was tested at concentrations ranging from 50 ppm to 250 ppm. Formulations B to E were blended from Formulation A. The corrosion testing solution included NACE 1D 196 brine solution (3.5 wt % NaCl, 0.305 wt % $CaCl_2.2H_2O$ and 0.186 wt % $MgCl_2.6H_2O$) containing 1000 ppm acetic acid. The solution was purged for 1 hr. using 100% $CO_2$ gas at 1 atm. partial pressure and continuously throughout the experiment, followed by addition of 500 ppm $Na_2S$ solution. The acetic acid-$Na_2S$ ratio would produce 500 ppm $H_2S$ gas in situ. A working pH of 4.8 was achieved at the $CO_2$ saturation point. The corrosion experiment was conducted at room temperature under 1000 rpm rotation speed using the RCE assembly from Gamry, which provided a specific shear stress equivalent to turbulent fluid flow conditions.

The corrosion inhibitor formulations were tested using electrochemical techniques such as linear polarization resistance (LPR) and potentiodynamic polarization resistance (PDP). The LPR measurements were performed within −10 to +10 mV of the $E_{corr}$ value at a scan rate of 0.167 mV s$^{-1}$. The PDP measurements were performed within −300 to +300 mV of the $E_{corr}$ value at a scan rate of 0.5 mV s$^{-1}$. All experiments were performed in one-compartment cell with three electrodes connected to Gamry Instrument Potentiostat/Galvanostat/ZRA (Reference 3000) with a Gamry framework system based on ESA410. Gamry applications include software DC105 for corrosion measurement and Echem Analyst 6.0 software package for data fitting. The electrochemical measurement procedure involved the use of a conventional three-electrode glass cell with a graphite electrode and a silver-silver chloride (Ag/AgCl) electrode as reference connected via a Lugging capillary bridge. The electrochemical tests were conducted by following the ASTM standard [ASTM G59-97(2009), Standard Test Method for Conducting Potentiodynamic Polarization Resistance Measurements, ASTM International, West Conshohocken, 2009, incorporated herein by reference in its entirety]. The corrosion inhibition efficiency (% IE) provided by the inhibitor formulations on the carbon steel surface was calculated from the electrochemical results using the following equation:

$$\% \, IE_{LPR/PDP} = 1 - \frac{CR_{(inh)}}{CR_{(blank)}} \times 100 \quad (1)$$

where $CR_{(blank)}$ and $CR_{(inh)}$ represent, respectively, the corrosion rate recorded in the absence and presence of a given formulation. The derivation of the CR, in terms of penetration rate, was calculated using the following equation, based on the ASTM standard [ASTM G102-89(2010), Standard Practice for Calculation of Corrosion Rates and Related Information from Electrochemical Measurements, ASTM International, West Conshohocken, 2010, incorporated herein by reference in its entirety].

$$CR(mpy) = \frac{k}{\rho} \times i_{corr} \times EW; \quad (11)$$

where k is a constant (0.1288 mpy·g/μA·cm), p is the density (g cm$^{-3}$), EW is the equivalent weight for the API 5L X60 steel and $i_{corr}$ is the measured corrosion current density (μA cm$^{-2}$).

Example 3

Results and Discussions: LPR

FIGS. 1A-I show the results obtained from the LPR measurements for the X60 steel sample undergoing sour corrosion in the absence and presence of the Formulations A to E. LPR measurement is one of the most important corrosion monitoring techniques used in oil and gas industry. LPR measurement can provide instantaneous values of polarization resistance ($R_p$) and corrosion rate (CR) which are direct indicators of the extent of attack inflicted on the steel during the sour corrosion. The derived values are presented in Table 2.

TABLE 2

Linear polarization resistance (LPR) parameters for API 5L X60 steel in $CO_2$-saturated NACE ID 196 brine containing 500 ppm $H_2S$ without and with Formulations A-E at room temperature

| Formulation (ppm) | | $E_{corr}$ (mV/Ag/AgCl) | $R_p$ (Ω cm²) | CR (mpy) | IE (%) |
|---|---|---|---|---|---|
| | Blank | −686 | 274 | 13.84 | — |
| Formulation A | 50 | −653 | 1412 | 3.02 | 78 |
| | 100 | −627 | 1915 | 1.98 | 86 |
| | 150 | −621 | 2482 | 1.53 | 90 |
| | 250 | −642 | 730 | 9.19 | 34 |
| Formulation B | 50 | −620 | 1440 | 2.65 | 81 |
| Formulation C | 50 | −638 | 1445 | 2.60 | 81 |
| Formulation D | 50 | −620 | 1776 | 2.14 | 85 |
| Formulation E | 150 | −619 | 2530 | 1.50 | 89 |

The absence of any corrosion inhibitor formulation exposes the steel sample to the most intense corrosion attack, as can be noticed by the highest value of CR and lowest value of $R_p$ in Table 2. The significant reduction in CR and increase in $R_p$ upon adding the inhibitor formulations confirms the efficiency of the disclosed formulation. Clearly, a corrosion inhibiting efficiency of up to 85% could be achieved at 50 ppm concentration of the formulation. For different concentrations of Formulation A, it was discovered that inhibition efficiency reached about 90% as the concentration went up to an optimum concentration of 150 ppm. However, any further increase in concentration of Formulation A beyond 150 ppm triggered a decline in corrosion inhibition efficiency. Under such condition, the inhibitor formulation may have attained a saturation point which promotes greater residence in the solution than migration to steel surface for surface protection. Similarly, an efficiency of up to 89% was reached for Formulation E tested at 150 ppm.

Example 4

Results and Discussions: LPR

Figure 2A:
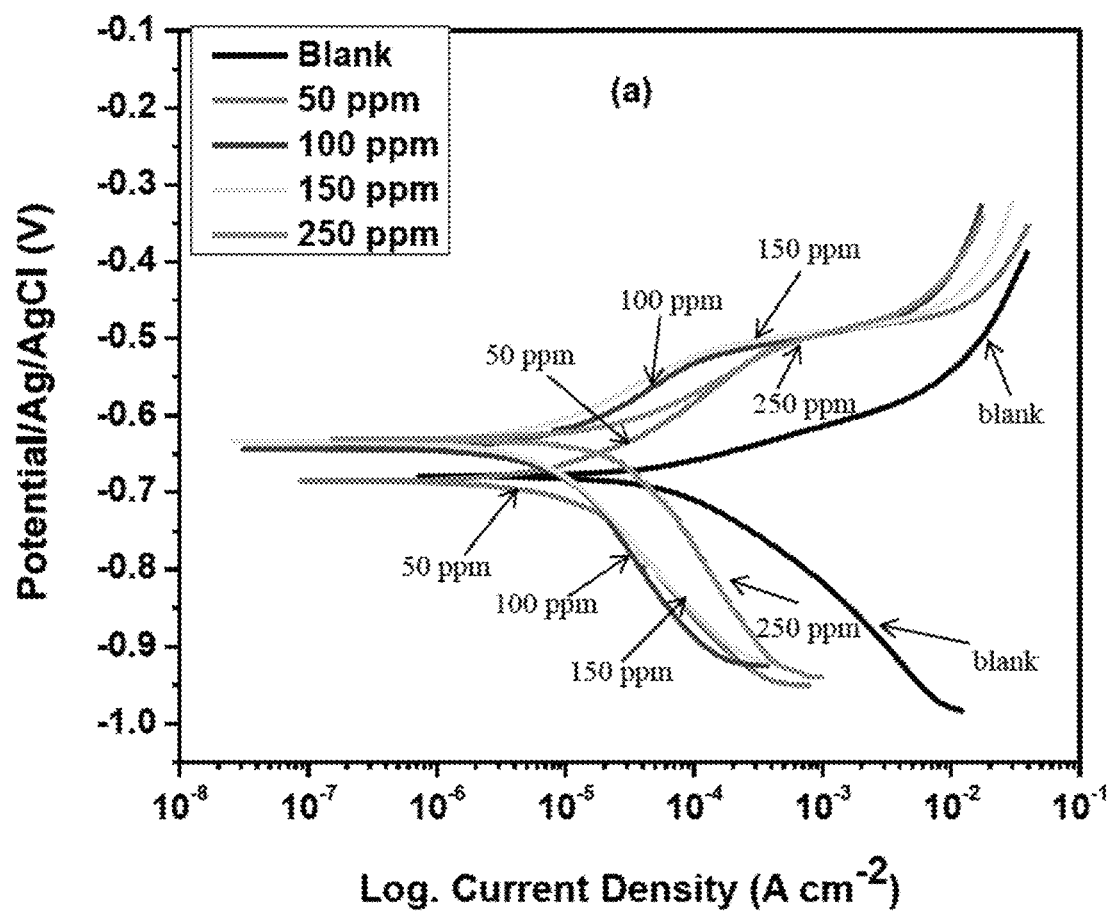
FIG. 2A shows an overlay of potentiodynamic polarization (PDP) curves for API 5L X60 steel measured in $CO_2$-saturated brine containing 500 ppm $H_2S$ without any corrosion inhibitor formulation (blank) and with corrosion inhibitor formulation A at different concentrations.
Figure 2B:
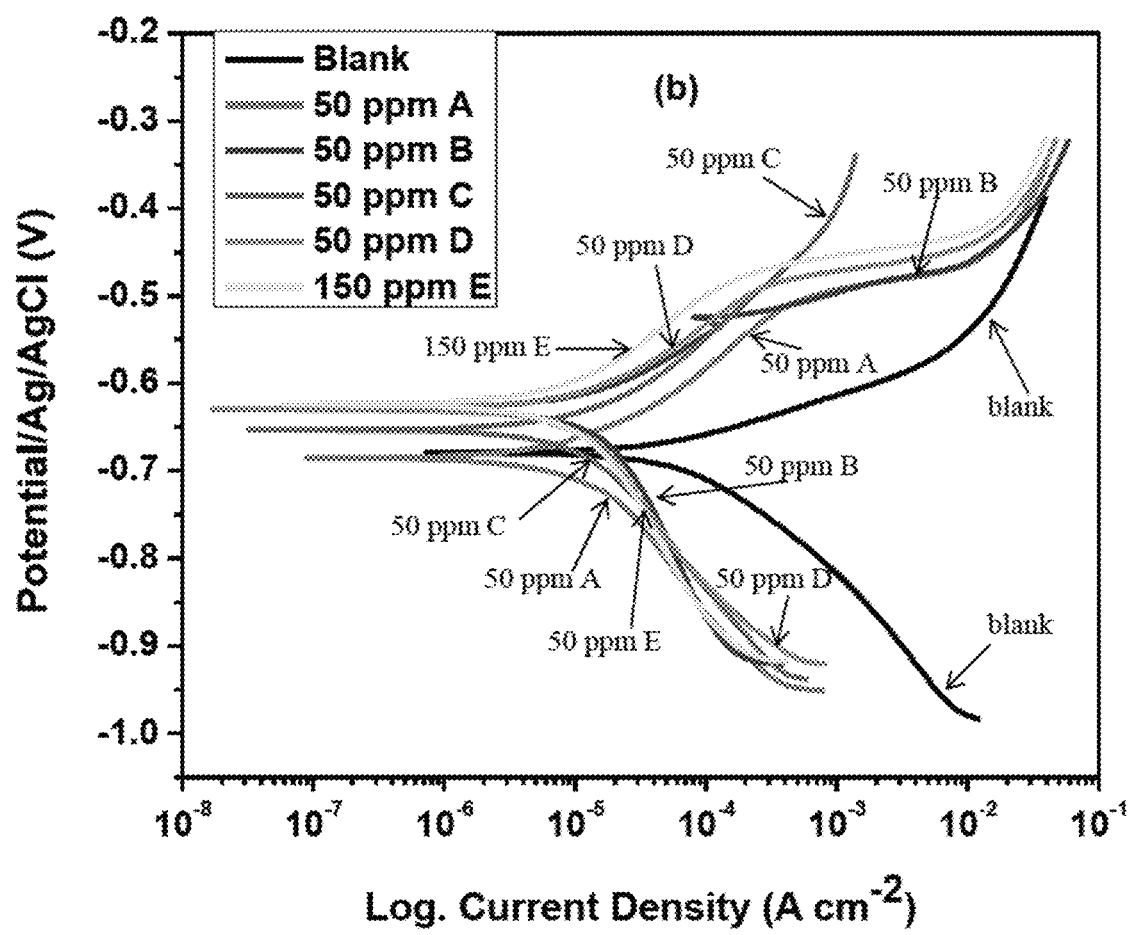
FIG. 2B shows an overlay of PDP curves for API 5L X60 steel measured in $CO_2$-saturated brine containing 500 ppm $H_2S$ without any corrosion inhibitor formulation (blank) and with corrosion inhibitor formulations A, B, C, D, and E, respectively.
Figure 3:
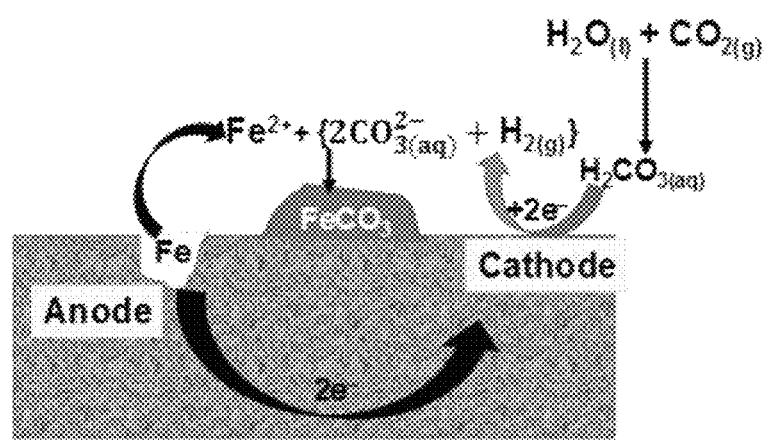
FIG. 3 is a schematic illustration of sweet corrosion electrochemistry.
Figure 4:
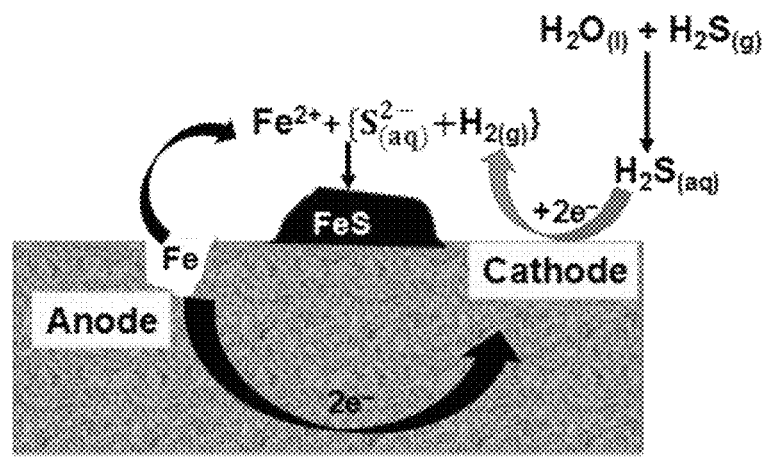
FIG. 4 is a schematic illustration of sour corrosion electrochemistry.

Potentiodynamic polarization (PDP) curves are provided in FIGS. 2A and 2B for the steel corrosion in the sour corrosion environment in the absence and presence of the corrosion inhibitor formulations. This technique elucidates the effect of inhibitor formulations on the kinetics (oxidation and reduction reactions) and mechanism of the steel corrosion in the sour environment. The polarization parameters are detailed in Table 3.

TABLE 3

Potentiodynamic polarization (PDP) for API 5L X60 steel in $CO_2$-saturated NACE ID 196 brine containing 500 ppm $H_2S$ without and with Formulations A-E at room temperature

| Formulation | (ppm) | $E_{corr}$ (mV/Ag/AgCl) | $i_{corr}$ (μA cm$^2$) | $\beta_a$ (mV Dec$^{-1}$) | CR (mpy) | IE (%) |
|---|---|---|---|---|---|---|
| | Blank | −680 | 67.10 | 61 | 9.985 | — |
| Formulation A | 50 | −685 | 9.22 | 94 | 1.341 | 87 |
| | 100 | −643 | 4.79 | 70 | 0.889 | 91 |
| | 150 | −634 | 4.59 | 68 | 0.667 | 93 |
| | 250 | −631 | 48.40 | 127 | 7.037 | 30 |
| Formulation B | 50 | −630 | 6.54 | 52 | 1.002 | 90 |
| Formulation C | 50 | −653 | 7.02 | 63 | 1.042 | 90 |
| Formulation D | 50 | −630 | 5.24 | 48 | 0.763 | 92 |
| Formulation E | 150 | −624 | 3.49 | 59 | 0.507 | 95 |

A direct relationship of corrosion rate (CR) and corrosion current density ($i_{corr}$) signifies the extent of corrosion attack on the material. Table 3 reveals that these values are essentially the highest for the uninhibited steel. Again, introduction of the inhibitor formulations apparently lowers both CR and $i_{corr}$ values. The trend of reduction in CR corresponds greatly with the previous observation from the LPR measurements for Formulations A to E, respectively. Inhibition efficiency of up to 95% was obtained by using Formulation E at 150 ppm. The disclosed inhibitor formulations lower both anodic and cathodic reactions during the steel sour corrosion and can be regarded as a mixed type inhibitor formulation.

Example 5

In summary, a family of corrosion inhibitor formulations containing azole derivatives, mercapto carboxylic acid derivatives, dihydropyrimidines, sulfhydryl alcohols, surfactants (e.g. quaternary ammonium compounds), and an alcohol as solvent is developed for use in sour corrosive environments prevalent in oil and gas wells. The corrosion inhibitor formulation may be useful for retarding the corrosion of steel alloys in very aggressive acidic, sweet ($CO_2$) and sour ($H_2S$) environments commonly found in the production, transport, and storage channels of oil and gas industries. The formulation can be applied at very low concentrations (in ppm levels) and reduce the rate of sour corrosion to acceptable levels in the oil and gas industry. Additionally, the inhibitor formulation can provide high efficiency under turbulent hydrodynamic conditions, making it suitable for real oilfield application. The inhibitor formulation of the present invention can provide an environmentally benign alternative for aggressive sweet and sour corrosion inhibition compared with conventional formulations based on aromatic amines and long chain alkyl imidazolines which possess well-known toxic properties. The inhibitor formulation of the present disclosure provides effective corrosion inhibition for API 5L X Grade steels and other common oil field alloys such as 13Cr, 25Cr, Inconel 825 and 316 L.

Key advantages of the disclosed corrosion inhibitor formulations include its chemical novelty, minimal toxicity, cost-effectiveness, as well as high anti-corrosion performance. Prospective buyers and users of the formulation include oil and gas industries (e.g. Saudi Aramco), oil servicing companies (e.g. Baker Hughes, Harliburton, Schlumberger), petrochemical industries (e.g. SABIC), metallurgical industries (e.g. Saudi Metal), and chemical companies dealing with oilfield chemicals.

The invention claimed is:
1. A corrosion inhibitor formulation, comprising:
a substituted benzimidazole of formula (I)

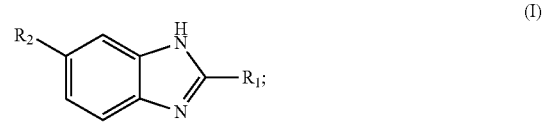

a mercaptocarboxylic acid;
a 2-thioxodihydropyrimidine-dione;
a sulfhydryl alcohol;
a surfactant; and
a solvent,
wherein:
$R_1$ is selected from the group consisting of a mercapto, an optionally substituted pyridyl, a carboxyl, an amide, and an optionally substituted aroyl; and
$R_2$ is selected from the group consisting of a hydrogen, a mercapto, a hydroxy, a carboxyl, an optionally substituted aroyl, an alkylamino, an amide, an ester, and a cyano,
with the proviso that the substituted benzimidazole is structurally different from the mercaptocarboxylic acid.
2. The corrosion inhibitor formulation of claim 1, wherein the substituted benzimidazole of formula (I) is at least one selected from the group consisting of 2-(2-pyridyl)benzimidazole, 2-(4-methyl-2-pyridyl)-1H-benzimidazole, and 2-(4-ethyl-2-pyridinyl)-1H-benzimidazole.

3. The corrosion inhibitor formulation of claim 1, wherein the mercaptocarboxylic acid is at least one selected from the group consisting of mercaptoacetic acid, mercaptopropionic acid, mercaptobutanoic acid, 2-sulfanyl-1H-benzimidazole-6-carboxylic acid, and 2-sulfanyl-1H-benzimidazole-5-carboxylic acid.

4. The corrosion inhibitor formulation of claim 1, wherein the 2-thioxodihydropyrimidine-dione is at least one selected from the group consisting of 2-thiobarbituric acid, 1,3-dimethyl-2-thiobarbituric acid, and 5-benzylidene-2-thiobarbituric acid.

5. The corrosion inhibitor formulation of claim 1, wherein the sulfhydryl alcohol is at least one selected from the group consisting of 2-mercaptoethanol, 3-mercapto-1-propanol, 1-mercapto-2-propanol, 2-mercapto-3-butanol, and 3-methyl-3-sulfanyl-1-butanol.

6. The corrosion inhibitor formulation of claim 1, wherein the surfactant is a quaternary ammonium salt.

7. The corrosion inhibitor formulation of claim 6, wherein the quaternary ammonium salt is at least one selected from the group consisting of cetyltrimethylammonium bromide, cetyltrimethylammonium chloride, tetradecyltrimethylammonium bromide, and tetradecyltrimethylammonium chloride.

8. The corrosion inhibitor formulation of claim 1, wherein the solvent is at least one selected from the group consisting of isopropanol, butanol, isobutanol, ethylene glycol, propylene glycol, 2-butoxyethanol, and diethylene glycol butyl ether.

9. The corrosion inhibitor formulation of claim 1, comprising:
10-50 wt % of the substituted benzimidazole of formula (I)

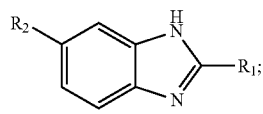
(I)

3-20 wt % of the mercaptocarboxylic acid;
3-25 wt % of the 2-thioxodihydropyrimidine-dione;
3-20 wt % of the sulfhydryl alcohol;
3-15 wt % of the surfactant; and
25-65 wt % of the solvent, each relative to a total weight of the formulation,
wherein:
$R_1$ is selected from the group consisting of a mercapto, an optionally substituted pyridyl, a carboxyl, an amide, and an optionally substituted aroyl; and
$R_2$ is selected from the group consisting of a hydrogen, a mercapto, a hydroxy, a carboxyl, an optionally substituted aroyl, an alkylamino, an amide, an ester, and a cyano,
with the proviso that the substituted benzimidazole is structurally different from the mercaptocarboxylic acid.

10. The formulation of claim 1, comprising:
30-40 wt % of the substituted benzimidazole of formula (I)

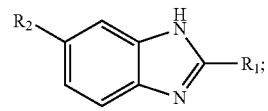
(I)

4-8 wt % of the mercaptocarboxylic acid;
4-8 wt % of the 2-thioxodihydropyrimidine-dione;
4-8 wt % of the sulfhydryl alcohol;
4-8 wt % of the surfactant; and
40-50 wt % of the solvent, each relative to a total weight of the formulation,
wherein:
$R_1$ is selected from the group consisting of a mercapto, an optionally substituted pyridyl, a carboxyl, an amide, and an optionally substituted aroyl; and
$R_2$ is selected from the group consisting of a hydrogen, a mercapto, a hydroxy, a carboxyl, an optionally substituted aroyl, an alkylamino, an amide, an ester, and a cyano,
with the proviso that the substituted benzimidazole is structurally different from the mercaptocarboxylic acid.

11. A method of inhibiting corrosion of a metallic substrate in contact with a corrosive medium, the method comprising:
mixing the corrosion inhibitor formulation of claim 1 with the corrosive medium in contact with the metallic substrate.

12. The method of claim 11, wherein the metallic substrate comprises steel.

13. The method of claim 11, wherein the metallic substrate comprises carbon steel.

14. The method of claim 11, wherein the corrosive medium comprises at least one inorganic acid, at least one inorganic salt, or both.

15. The method of claim 14, wherein the corrosive medium comprises at least one of $CO_2$, $H_2S$, and brine.

16. The method of claim 11, wherein the corrosion inhibitor formulation is introduced into the corrosive medium at a concentration of 5-250 ppm.

17. The method of claim 11, wherein the corrosive medium has a temperature in a range of 4-80° C.

18. The method of claim 11, which has a corrosion inhibition efficiency in a range of 30-98%.

19. The method of claim 11, wherein the corrosion inhibitor formulation imparts a corrosion rate in a range of 0.4-9 mils penetration per year (mpy) to the metallic substrate.

20. The method of claim 11, wherein the metallic substrate is part of a system for oil or gas production, transportation, or refining.

* * * * *